United States Patent
Lei et al.

(10) Patent No.: US 10,339,336 B2
(45) Date of Patent: Jul. 2, 2019

(54) METHOD AND APPARATUS FOR ENCRYPTING DATABASE COLUMNS

(75) Inventors: Chon Hei Lei, Alameda, CA (US); Thomas Keefe, South San Francisco, CA (US); Daniel M. Wong, South San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1279 days.

(21) Appl. No.: 10/459,811

(22) Filed: Jun. 11, 2003

(65) Prior Publication Data
US 2004/0255133 A1  Dec. 16, 2004

(51) Int. Cl.
*G06F 21/62* (2013.01)

(52) U.S. Cl.
CPC .................. *G06F 21/6227* (2013.01)

(58) Field of Classification Search
CPC .................................................... G06F 21/6227
See application file for complete search history.

(56) References Cited

U.S. PATENT DOCUMENTS

| | | | |
|---|---|---|---|
| 5,052,040 A | 9/1991 | Preston et al. | 380/4 |
| 5,311,595 A * | 5/1994 | Bjerrum et al. | 713/169 |
| 5,369,702 A | 11/1994 | Shanton | 380/4 |
| 5,751,949 A | 5/1998 | Thomson et al. | 395/187 |
| 5,852,046 A | 12/1998 | Lang | |
| 5,898,781 A | 4/1999 | Shanton | 380/25 |
| 5,924,094 A * | 7/1999 | Sutter | 707/10 |
| 5,963,642 A * | 10/1999 | Goldstein | 713/193 |
| 5,966,707 A * | 10/1999 | Van Huben et al. | 707/10 |
| 6,185,681 B1 * | 2/2001 | Zizzi | 713/165 |
| 6,292,899 B1 * | 9/2001 | McBride | 726/22 |
| 6,327,594 B1 * | 12/2001 | Van Huben et al. | 707/200 |
| 6,327,595 B1 * | 12/2001 | Lyson | G06F 21/6227 |
| 6,336,121 B1 * | 1/2002 | Lyson | G06F 21/6227 |
| 6,339,832 B1 * | 1/2002 | Bowman-Amuah | 714/35 |

(Continued)

FOREIGN PATENT DOCUMENTS

| EP | 0 518 466 A1 | 12/1992 | |
|---|---|---|---|
| EP | 1089194 A2 | 4/2001 | G06F 17/30 |

(Continued)

OTHER PUBLICATIONS

Bruce Benfield, Richard Swagerman: Encrypting Data Values in DB2 Universal Database, Online! Aug. 14, 2001 (Aug. 14, 2001), pp. 1-5, XP002295440. Retrieved from the Internet: URL:http://www-106.ibm.com/developworks/db2/library/techarticle/benfield/0108benfield.html> retrieved on Sep. 8, 2009! The whole document.

*Primary Examiner* — Tamara T Kyle
(74) *Attorney, Agent, or Firm* — Shun Yao; Park, Vaughan, Fleming & Dowler LLP

(57) ABSTRACT

One embodiment of the present invention provides a system that facilitates encryption of data within a column of a database. The system operates by first receiving a command to perform a database operation. Next, the system parses the command to create a parse tree. The system then examines the parse tree to determine if a column referenced in the parse tree is an encrypted column. If a column referenced in the parse tree is an encrypted column, the system automatically transforms the command to include one or more cryptographic commands to facilitate accessing the encrypted column while performing the database operation.

27 Claims, 4 Drawing Sheets

(56) References Cited

U.S. PATENT DOCUMENTS

| | | | |
|---|---|---|---|
| 6,434,568 B1* | 8/2002 | Bowman-Amuah | |
| 6,442,748 B1* | 8/2002 | Bowman-Amuah | 717/108 |
| 6,564,225 B1* | 5/2003 | Brogliatti et al. | 707/104.1 |
| 7,093,137 B1* | 8/2006 | Sato | G06F 21/6227 |
| | | | 380/277 |
| 7,111,005 B1* | 9/2006 | Wessman | G06F 21/604 |
| 7,269,729 B2* | 9/2007 | He | G06F 17/30595 |
| | | | 380/279 |
| 2001/0029582 A1* | 10/2001 | Goodman et al. | 713/193 |
| 2002/0078049 A1* | 6/2002 | Samar | 707/9 |
| 2003/0014394 A1 | 1/2003 | Fujiwara et al. | 707/3 |
| 2003/0046572 A1 | 3/2003 | Newman et al. | 713/193 |
| 2004/0243816 A1* | 12/2004 | Hacigumus et al. | 713/193 |
| 2005/0044366 A1* | 2/2005 | Pucheral et al. | 713/172 |
| 2006/0005017 A1* | 1/2006 | Black et al. | 713/165 |
| 2006/0095791 A1* | 5/2006 | Wong | 713/189 |
| 2006/0236104 A1* | 10/2006 | Wong et al. | 713/168 |
| 2006/0288232 A1* | 12/2006 | Ho et al. | 713/185 |
| 2007/0079140 A1* | 4/2007 | Metzger et al. | 713/189 |
| 2007/0174271 A1* | 7/2007 | Mattsson et al. | 707/5 |
| 2008/0033960 A1* | 2/2008 | Banks et al. | 707/9 |
| 2009/0077378 A1* | 3/2009 | Hacigumus et al. | 713/165 |
| 2011/0113050 A1* | 5/2011 | Youn et al. | 707/757 |

FOREIGN PATENT DOCUMENTS

| | | | | |
|---|---|---|---|---|
| EP | 1207462 A2 | 7/2001 | | G06F 17/30 |
| WO | WO 0135226 A1 | 5/2001 | | G06F 12/14 |
| WO | WO 0229577 A2 | 4/2002 | | G06F 12/14 |

\* cited by examiner

BOTH THE EO AND THE DO SHARE THE SAME KEY SO THEY SHARE THIS NODE RESULT

METHOD AND APPARATUS FOR ENCRYPTING DATABASE COLUMNS

RELATED APPLICATION

The subject matter of this application is related to the subject matter in a co-pending non-provisional application by Richard R. Wessman entitled, "Method and Apparatus for Automatic Database Encryption," having Ser. No. 09/680,599, and filing date 6 Oct. 2000.

BACKGROUND

Field of the Invention

The present invention relates to database security. More specifically, the present invention relates to a method and an apparatus for transparently encrypting and decrypting data on a column-by-column basis within a database.

Related Art

Database security is an important feature in many database systems. In database systems, security is often achieved by encrypting data within the database system. Currently, there are two primary approaches for encrypting data stored in a database system. The first approach can be characterized as "bulk encryption" and performs cryptographic operations on entire database files. The second approach selectively applies cryptographic operations to specific sensitive columns within a database.

Bulk encryption typically entails encryption of the entire database because sensitive data is not just stored inside a particular table. Sensitive data may also appear in other database objects. For example, sensitive data may appear in an index, in change records of undo and redo logs, and in temporary sorting areas. Since these database objects are designed to be shared by the entire database system, it is not practical to separate data within these database objects so that some data is encrypted and some is not.

While bulk encryption is relatively simple to implement and is transparent to an application accessing the database, there are significant drawbacks. Chief among these drawbacks is the system performance degradation. It takes a long time to encrypt or decrypt the entire database file. In such a system, a rekey operation can involve decrypting and then re-encrypting the entire database file. These operations can take a large amount of time, which makes this solution unfit for large on-line transaction processing deployments. Also, the security of the system can be compromised because database records are exposed in shared memory as plain text after the data records are decrypted from the files.

The second approach limits the encryption to only those sensitive columns within the database, which can theoretically reduce the overhead involved in performing cryptographic operations. However, the systems currently available that use this approach suffer from some major drawbacks. The encrypt and decrypt operations must be explicitly applied to any references of the encrypted columns. For example, an application desiring to issue a command to retrieve the credit card number of a customer whose social security number is '123456789' might issue the command:

select   credit_card_number   from   tab   where ssn='123456789'

However, if both of these columns are encrypted, the query must be modified to include the decryption commands, such as:

select decrypt(credit_card_number) from tab where decrypt(ssn)='123456789'

Note that the encrypt and decrypt functions must also provide interfaces for selecting the cryptographic algorithm and the application must provide key management.

Therefore, in this second approach the encryption and decryption operations are not transparent to application developers despite claims to the contrary by database system vendors. When a sensitive column is accessed, the encrypt or decrypt functions must explicitly be applied to the column data. To make such runtime function execution transparent to the user and secured, the application schema objects must be significantly altered. For example, a table with sensitive columns must be turned into a view in order to hide the cryptographic functions. This also means then that base object must be renamed because views and tables are in the same name space and cannot share a name. Triggers need to be created so that insert or update of the views will cause the data in the base table to be encrypted implicitly. Moreover, index support is limited because the server can build an index only with encrypted data which has lost its lexicographical order. This is so because encrypt and decrypt operations cannot be integrated with the index processing layers.

Hence, what is needed is a method and an apparatus for transparently encrypting and decrypting data on a column-by-column basis within a database system.

SUMMARY

One embodiment of the present invention provides a system that facilitates encryption of data within a column of a database. The system operates by first receiving a command to perform a database operation. Next, the system parses the command to create a parse tree. The system then examines the parse tree to determine if a column referenced in the parse tree is an encrypted column. If a column referenced in the parse tree is an encrypted column, the system implicitly transforms the parse tree to include one or more cryptographic operations to facilitate accessing the encrypted column while performing the database operation.

In a variation of this embodiment, if the database operation includes a reference operation from the encrypted column, the system transforms the parse tree to decrypt data retrieved from the encrypted column during the reference operation to provide clear text.

In a further variation, if the command includes an update operation to the encrypted column, the system transforms the parse tree to encrypt data being updated in the encrypted column during the update operation to place encrypted data in the database.

In a further variation, if a column referenced in the parse tree is encrypted, the system identifies a cryptographic key for the column. The key is recovered only once for all accesses to the column for each command.

In a further variation, examining the parse tree involves determining if the user command is an explicit request to encrypt a presently unencrypted column in the database. If so, the system encrypts the column.

In a further variation, examining the parse tree involves determining if the user command is an explicit request to change an encryption key for a column. If so, the system decrypts the column with the current encryption key, and encrypts the column with a new encryption key.

In a further variation, examining the parse tree involves determining if the user command is an explicit request to decrypt an encrypted column in the database. If so, the system decrypts the column.

In a further variation, examining the parse tree involves determining if the user command is an explicit request to change an encryption algorithm for a column. If so, the system decrypts the column with a current encryption algorithm, and encrypts the column with a new encryption algorithm.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
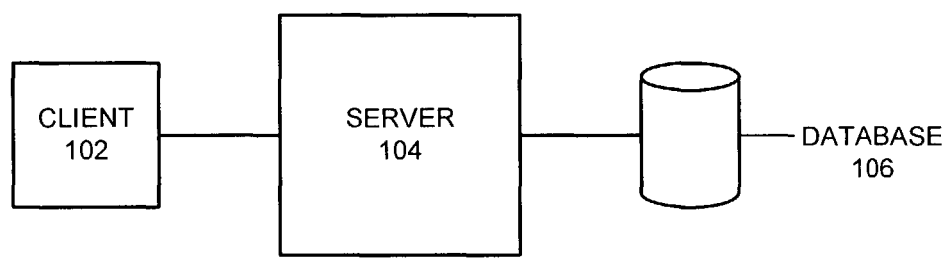
FIG. 1 illustrates a database system in accordance with an embodiment of the present invention.

FIG. 1 illustrates a database system in accordance with an embodiment of the present invention. The database system includes client 102, server 104, and database 106. Client 102 can generally include any node on a network including computational capability and may include a mechanism for communicating across the network.

Server 104 can generally include any computational node including a mechanism for servicing requests from a client for computational and/or data storage resources. Server 104 communicates with one or more clients and provides services to each client. This communication is typically across a network (not shown) such as the Internet or a corporate intranet. Server 104 may be implemented as a cluster of servers acting in concert to supply computational and database services.

Database 106 can include any type of system for storing data in non-volatile storage. This includes, but is not limited to, systems based upon magnetic, optical, and magneto-optical storage devices, as well as storage devices based on flash memory and/or battery-backed up memory. Database 106 can be directly coupled to server 104 or can be accessed across a network such as a corporate intranet or the Internet.

During operation, client 102 sends database commands to server 104. These commands are typically in a database language such as structured query language (SQL) and can include reference and update operations on database 106. If any of these reference or update operations include operations on encrypted columns, the operations are processed as described below in conjunction with FIGS. 2-5.

Server

Figure 2:
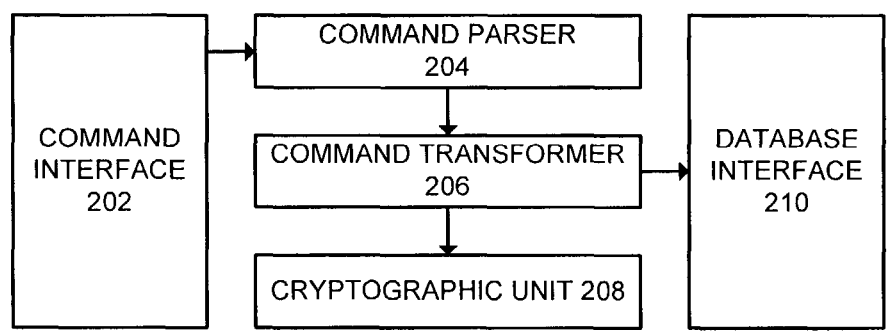
FIG. 2 illustrates a server in accordance with an embodiment of the present invention.

FIG. 2 illustrates a server 104 in accordance with an embodiment of the present invention. Server 104 includes client interface 202, command parser 204, command transformer 206, cryptographic unit 208, and database interface 210. Client interface 202 communicates with client 102 to accept commands and to respond to commands from client 102. These commands can include SQL commands for server 104, which operate on database 106.

Command parser 204 parses the command into the individual elements (operands, operators, etc.) that comprise the command. Command parsing is well known in the art and will not be discussed further in this description.

Command transformer 206 examines the parsed elements of the command to locate any reference or update operations related to encrypted columns within database 106. Upon locating a reference or update operation related to an encrypted column, command transformer 206 transforms the operation to include the necessary cryptographic operations to access the encrypted column. These transforming operations are described in detail in conjunction with FIGS. 4A and 4B below.

Cryptographic unit 208 performs cryptographic operations such as key management, encryption, and decryption. Any of a large number of standard key management systems can be used with this system. Encryption and decryption can be performed using any acceptable algorithm, such as the data encryption standard (DES), triple DES, or the advanced encryption standard (AES). Additionally, these encryption algorithms can be combined with integrity techniques such as secure hash algorithm 1 (SHA-1) or message digest 5 (MD5).

Database interface 210 includes mechanisms for accessing database 106. These accessing operations can include retrieving data from database 106 and storing or updating data within database 106. Note that transformation of a command and execution of the command may not happen in the same sequence of events. Execution of the command may happen at a later time.

Transforming Database Operations

Figure 3:
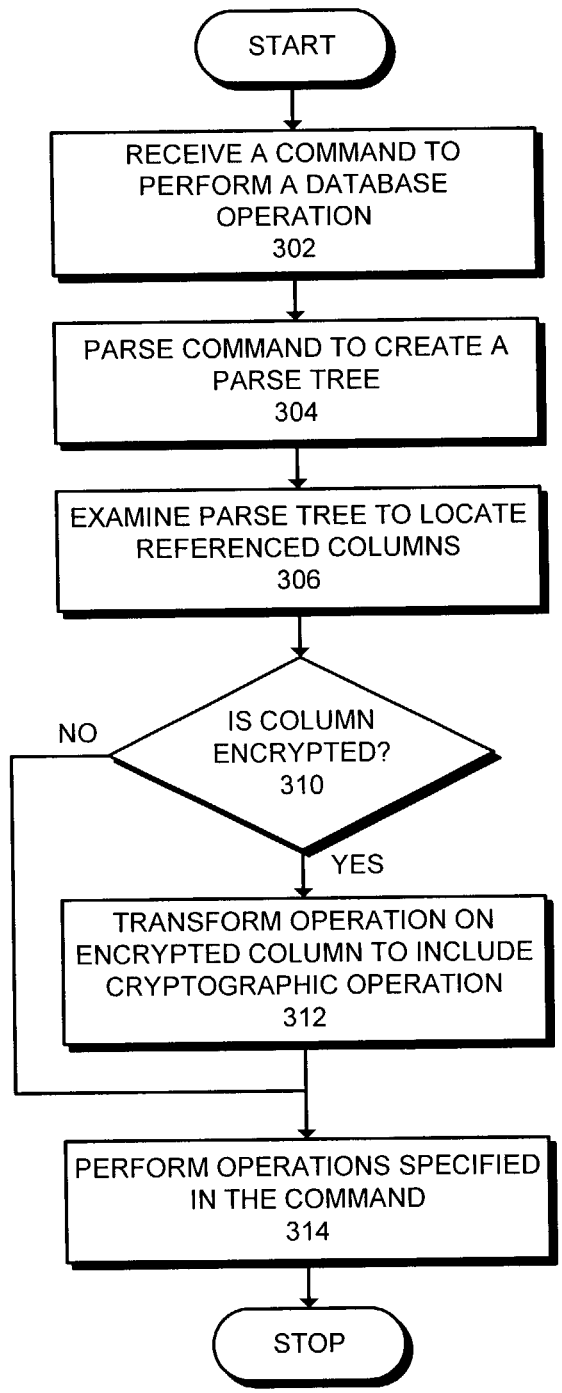
FIG. 3 presents a flowchart illustrating the process of transforming a database query to include cryptographic operations in accordance with an embodiment of the present invention.

FIG. 3 presents a flowchart illustrating the process of transforming database operations to include cryptographic operations in accordance with an embodiment of the present invention. The system starts when a command is received to perform a database operation (step 302). Next, the system parses the command to create a parse tree (step 304). The system then examines this parse tree to locate a referenced columns or expression associated with encrypted data (step 306).

After locating a referenced column, the system determines if the column is encrypted (step 308). If so, the system transforms the operation on this encrypted column to include cryptographic operations (step 310). Note that this transforming process is transparent to the user.

If the column is not encrypted at step 308 or after transforming the command to include cryptographic operations at step 310, the system performs the operations specified in the command thereby completing the command (step 312). Note that transformation of a command and execution of the command may not happen in the same sequence of events. Execution of the command may happen at a later time.

Parse Trees

Figure 4A:
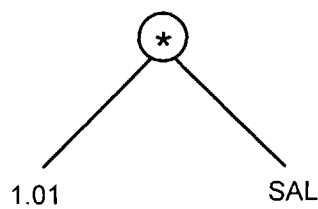
FIG. 4A presents a parse tree without transformation in accordance with an embodiment of the present invention.

FIG. 4A presents a parse tree without transformation in accordance with an embodiment of the present invention. The system parses the entered command producing a parse tree. For example, the parse tree presented in FIG. 4A illustrates how the command:

UPDATE employee SET sal=1.01*sal;

is parsed. The operator "*" multiplies the left sub-tree (1.01) times the right sub-tree (sal) and returns the results to the database in the "sal" column. This parse tree assumes that the "sal" column is not encrypted.

Figure 4B:
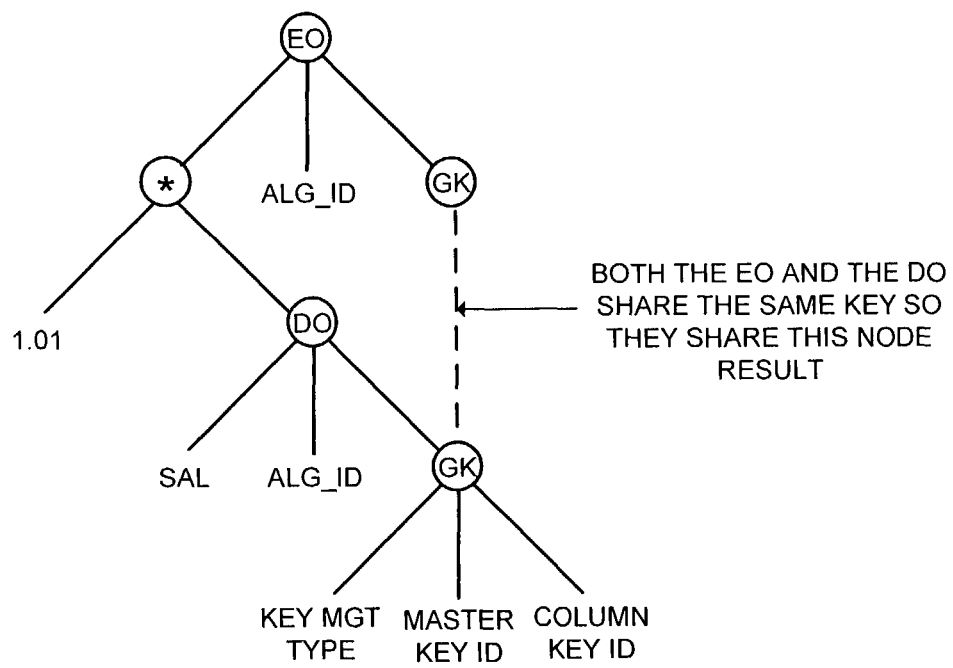
FIG. 4B presents a transformed parse tree in accordance with an embodiment of the present invention.

FIG. 4B presents a transformed parse tree in accordance with an embodiment of the present invention. This parse tree assumes that the column "sal" is encrypted. Again, the operator "*" multiplies its left sub-tree times its right sub-tree. The right sub-tree, however, has been transformed to include the decryption operator "DO." The DO operator uses the supplied parameters to decrypt the column in the left sub-tree (sal in this example). The parameters supplied to DO are the algorithm identifier "alg_id" and the results of the "GK" operator. The "GK" operator is the get key operator which retrieves the column encryption key using the supplied parameters. The input parameters to the "GK" operator are the key management type, the master key identifier, and the column key identifier.

After the DO has decrypted the "sal" column and the results have been multiplied by 1.01 by the "*" operator, the encryption operator "EO" encrypts the results and passes the results back to the database for storage in the "sal" column. The inputs to the EO operator are the results of the "*" operator, the algorithm identifier "alg_id" and the results of the "GK" operator. Note that since the key has not changed, the results of the "GK" operator for the decryption are shared with the EO for encryption. In fact, the "GK" operator is invoked only once to update the entire "sal" column.

Commands Involving Cryptography for a Referenced Column

Figure 5:
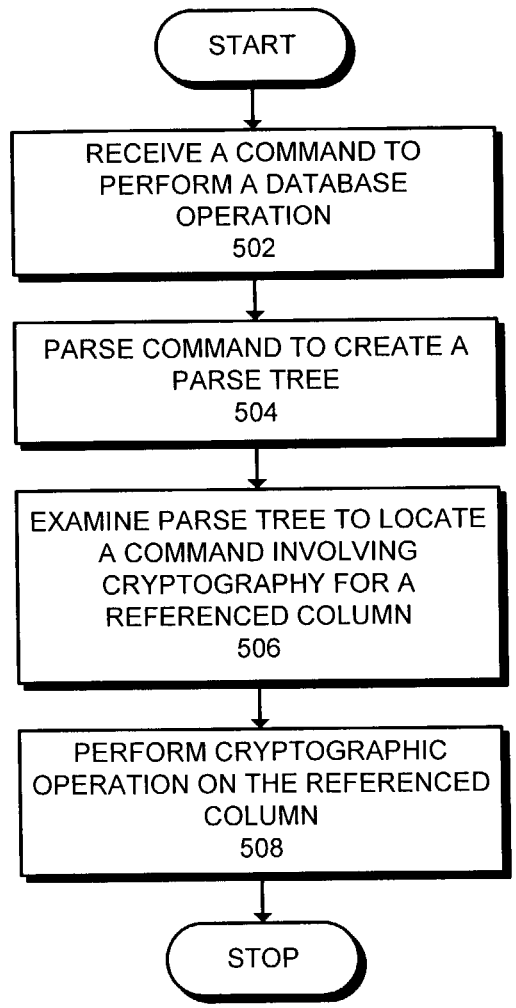
FIG. 5 presents a flowchart illustrating the process of executing a command involving cryptography for a column in accordance with an embodiment of the present invention.

FIG. 5 presents a flowchart illustrating the process of executing a command involving cryptography for a column in accordance with an embodiment of the present invention. The system starts when a command is received to perform a database operation (step 502). Next, the system parses the command to create a parse tree (step 504). The system then examines this parse tree to determine if the command involves cryptography for a referenced column (step 506). If so, the system performs the cryptographic operation on the referenced column (step 508).

As an example, if the command is a command to change the encryption key, such as:

ALTER TABLE employee MODIFY (ssn REKEY);

The system first updates the metadata for the column. The system then implicitly issues an update statement, which is transformed into the following UPDATE statement for execution:

UPDATE (employee SET ssn=ENCRYPT(DECRYPT (ssn, k_algorithm_id, GET_KEY(key_mgn_type, master_key_id, col_key_id)), k_algorithm_id, GET_KEY (key_mgn_type, master_key_id, new_col_key_id));

Overview

The present invention provides encryption of data at the granularity of a column or column attribute (in the case of an Object database). This encryption is transparent to the applications that access the encrypted columns within the database.

Instead of relying on built-in or user defined encrypt and decrypt functions, the secrecy of a column is supported as part of the column properties. Like any other column properties, such as constraints or data type, the cryptographic characteristics of the column can be defined and altered at any time using data definition language (DDL) commands. The following are examples of typical administrative tasks that define and alter encrypted column properties.

The sensitive data can be re-encrypted with a different encryption algorithm using a statement such as:

ALTER TABLE employee MODIFY (ssn ENCRYPT USING 'AES128');

The system first updates the metadata for the column. The system then implicitly issues an update statement, which is transformed into the following UPDATE statement for execution:

UPDATE (employee SET ssn=ENCRYPT(DECRYPT (ssn, k_algorithm_id, GET_KEY(key_mgn_type, master_key_id, col_key_id)), AES128, GET_KEY (key_mgn_type, master_key_id, col_key_id));

Security requirements may require that the encryption key be changed periodically. Changing the encryption key can be accomplished based on the exemplary UPDATE statement described in conjunction with step 508 of FIG. 5.

If a decision is made to make the encrypted data available in plaintext instead, the following command can be used:

ALTER TABLE employee MODIFY (ssn DECRYPT);

The system first updates the metadata for the column. The system then implicitly issues an update statement, which is transformed into the following UPDATE statement for execution:

UPDATE (employee SET ssn=(DECRYPT(ssn, k_algorithm_id, GET_KEY(key_mgn_type, master_key_id, col_key_id))));

A column can also be declared as encrypted when a table is created. The following DDL command gives an example of encrypting the SSN and salary fields of an employee table during creation of the employee table:

CREATE TABLE(
name VARCHAR2(30),
employee_id NUMBER(10),
SSN NUMBER(9) ENCRYPT USING 'DESS' AND HASH USING 'MD5',
address VARCHAR2(256),
city VARCHAR2(80),
state VARCHAR2(80),
zip-code VARCHAR2(10),
salary NUMBER(10) ENCRYPT, date_of birth DATE,
title VARCHAR2(30))
;

When a column is specified as encrypted, all data in that column is encrypted with a column encryption key. This key is wrapped by one or more master keys before being stored in the server's metadata table. Retrieval of the master keys depends upon the selected key management scheme and the storage location of the master keys. This means that for any column cryptographic operation, the server must first find the master key and then use the master key to decrypt the encrypted column encryption key.

Runtime support of transparent cryptographic operations is based on the introduction of three internal operators on the server. They are (1) column encryption key retrieval, (2) encrypt data, and (3) decrypt data.

The key retrieval operator has arguments to accept the column encryption key identity, the master key identity, and the key management type. This operator returns the column encryption key in plain text.

The encrypt and decrypt operators have arguments for identifying the encrypted column data, the column encryption key, and the encryption algorithm identity. The key retrieval operator is separated from the encrypt/decrypt operators because it is desirable for the key retrieval operator to be evaluated only once per statement execution.

At statement parse time, a decrypt operator can be implicitly added around column attributes, which will receive encrypted data from the server. After the transformation, a typical reference of a column alone in an expression is equivalent to the following as if the decrypt function was explicitly applied.

DECRYPT (column, k_algorithm_id, GET_KEY (key_mgn_type, master_key_id, col_key_id))

For expression values, which will be placed in the database as inserted or updated values, encrypt operators are added as in:

ENCRYPT (expression, k_algorithm_id, GET_KEY (key_mgn_type, master_key_id, col_key_id))

Note that the arguments to the DECRYPT and ENCRYPT commands, except for the encrypted column data, are known at parse time because these values are included in the metadata being maintained at the time of a DDL command, which affects the encrypted column. These arguments are part of the statement context in the shared memory. However, these arguments reveal no sensitive information. The encryption key itself is retrieved only once at execution time and will appear only in the user session's per-execution memory. The algorithm for key encryption can be a system-wide configurable parameter or an optional argument can be added to the GET_KEY command.

At execution time, because of the implicit transformation on the statement context as described above, the encrypted data is decrypted before an expression evaluation. The plain text is encrypted after expression evaluation for inserted and updated values going into the persistent store. This also guarantees that the column's native data type format is preserved during encryption and decryption. Therefore, existing implementations for expression evaluation are not affected.

For example, assume that the salary column "sal" in the employee table is encrypted. The following update statement for a pay raise:

UPDATE employee SET sal=1.01*sal WHERE empno=999999;

would actually be executed as:

UPDATE (employee SET sal=ENCRYPT(1.01*DECRYPT(sal, k_algorithm_id, GET_KEY(key_mgn_type, master_key_id, col_key_id)), k_algorithm_id, GET_KEY(key_mgn_type, master_key_id, col_key_id))
WHERE empno=999999);

The key retrieval operator is capable of supporting multiple key management schemes where every master key or column encryption key has its own identity, which is universally unique. Note that the column encryption key protecting a particular column can have multiple copies, with each copy being wrapped by a different master key.

The following is an example showing the flexibility of the system. Assume that the system has a key management type identified by the variable "SERVER_HELD." In this scheme, all of the column encryption keys are wrapped by a single master key kept in the server's wallet. The administrator may use the wallet manager to generate any number of master keys. The server, however, will pick only one for the database when a SQL command such as:

ALTER DATABASE MASTER KEY my_db_ms_key;
is issued.

Hence, the my_db_ms_key is the key's external name. The server also creates a universally unique identity associated with the key. The server remembers only the current master key identity, while the key itself remains in the wallet. The adoption of a master key may also take place at database creation time because the wallet manager is not part of the database. Note that the above command also entails a re-key of all the column encryption keys in the database. The encrypted column data is not affected, however.

When the server generates a new column encryption key or replaces an old column encryption key as a result of one of the DDLs which manage the encrypted column, the column encryption key is wrapped by the server master key. The column encryption key ID, the master key ID, and the encrypted column key information are used as parameters for the key retrieval operator GET_KEY as described above. Based on the "SERVER_HELD" key management type, the operator is able to find the server master key in the wallet through the wallet application programming interface (API) and thereby recover the plain text column encryption key used for both encrypt and decrypt operations.

Clearly, the logic of the key retrieval operator is driven by the key management type. The key retrieval always sees the column encryption key identity and the master key identity. New key management schemes can easily be plugged into the system without affecting the implementation of the transparent data conversion between clear text and cipher text. With these universally unique identities, the keys can be stored anywhere as long as the operator can find them at runtime. DDL commands may need to be enhanced or new DDL commands may need to be added to support different key management types.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing encrypted columns in a database, comprising:
   receiving, by a database system on a server computer, a database query command directed to a column in the database;
   determining, by the database system, whether the column is encrypted based on metadata for the column; and
   responsive to determining that the column is encrypted:
      determining a plurality of database commands performing a plurality of inter-dependent cryptographic operations on the database query command, wherein a first database command of the plurality of database commands retrieves a key encrypting the column, and wherein a second operation of the plurality of database commands decrypts the encrypted column;
      inserting in the database query command, by the database system, the plurality of database commands to generate a modified query command; and
      performing the modified query command, by the database system, that decrypts the encrypted column to obtain column data of the column and performs the received database query command on the obtained column data.

2. The method of claim 1, wherein the database query command includes a reference operation from the encrypted column.

3. The method of claim 1, wherein in response to the database query command including an update operation to the encrypted column, a third database command of the plurality of the database commands encrypts data being updated in the encrypted column.

4. The method of claim 1, wherein the key encrypting the column is wrapped by one or more master keys and stored in a metadata table.

5. The method of claim 1, further comprising:
   determining whether the database query command includes an explicit command to encrypt the column in the database; and
   in response to determining that the database query command includes an explicit command to encrypt the column, encrypting the column.

6. The method of claim 1, further comprising:
   determining whether the database query command is associated with an operation to define or alter cryptographic characteristics for the column;
   in response to determining that the database query command is associated with the operation to define or alter cryptographic characteristics for the column, updating the cryptographic characteristics, which comprises changing an encryption key for the column, wherein changing the encryption key for the column involves:
      decrypting the column with a current encryption key, and
      encrypting the column with a new encryption key; and
   performing a cryptographic operation associated with the updated cryptographic characteristics.

7. The method of claim 1, further comprising:
   determining whether the database query command includes an explicit command to decrypt the column in the database; and
   in response to determining that the database query command includes the explicit command to decrypt, decrypting the column using the explicit command.

8. The method of claim 1, further comprising:
   determining whether the database query command includes an explicit command to change an encryption function for the column; and
   in response to determining that the database query command includes an explicit command to change an encryption function for the column,
      decrypting the column using a previous encryption function, and
      encrypting the column using a new encryption function.

9. A non-transitory computer-readable storage medium storing instructions that when executed by a computer cause the computer to perform a method for accessing encrypted columns in a database server, the method comprising:
   receiving, by a database system on a server computer, a database query command directed to a column in the database;
   determining, whether the column is encrypted based on metadata for the column; and
   responsive to determining that the column is encrypted:
      determining a plurality of database commands performing a plurality of inter-dependent cryptographic operations on the database query command, wherein a first database command of the plurality of database commands retrieves a key encrypting the column, and wherein a second operation of the plurality of database commands decrypts the encrypted column;
      inserting in the query command, by the database system, the plurality of database commands to generate a modified query command; and
      performing the modified command, by the database system, that decrypts the encrypted column to obtain column data of the column and performs the received database query command on the obtained column data.

10. The computer-readable storage medium of claim 9, wherein the database query command includes a reference operation from the encrypted column.

11. The computer-readable storage medium of claim 9, wherein in response to the command including an update operation to the encrypted column, a third database command of the plurality of the database commands encrypts data being updated in the encrypted column.

12. The computer-readable storage medium of claim 9, wherein the key encrypting the column is wrapped by one or more master keys and stored in a metadata table.

13. The computer-readable storage medium of claim 9, wherein the method further comprises:
   determining whether the database query command includes an operation to encrypt the column in the database; and
   in response to determining that the database query command includes an explicit command to encrypt the column, encrypting the column.

14. The computer-readable storage medium of claim 9, wherein the method further comprises:
   determining whether the database query command is associated with an operation to define or alter cryptographic characteristics for the column;
   in response to determining that the database query command is associated with the operation to define or alter cryptographic characteristics for the column, updating the cryptographic characteristics, which comprises changing an encryption key for the column, wherein changing the encryption key for the column involves:
      decrypting the column with a current encryption key, and
      encrypting the column with a new encryption key; and
   performing a cryptographic operation associated with the updated cryptographic characteristics.

15. The computer-readable storage medium of claim 9, wherein the method further comprises:
  determining whether the database query command includes an explicit command to decrypt the column in the database; and
  in response to determining that the database query command includes the explicit command to decrypt, decrypting the column using the explicit command.

16. The computer-readable storage medium of claim 9, wherein the method further comprises:
  determining whether the database query command includes an explicit command to change an encryption function for the column; and
  in response to determining that the database query command includes an explicit command to change an encryption function for the column,
    decrypting the column using a previous encryption function, and
    encrypting the column using a new encryption function.

17. An apparatus for accessing encrypted columns in a database system, comprising:
  a receiving mechanism configured to receive a database query command directed to a column in a database;
  a determining mechanism configured to determine whether the column is encrypted based on metadata for the column; and
  responsive to determining that the column is encrypted, determine a plurality of database commands performing a plurality of inter-dependent cryptographic operations on the database query command, wherein a first database command of the plurality of database commands retrieves a key encrypting the column, and wherein a second operation of the plurality of database commands decrypts the encrypted column;
  a query-modification mechanism configured to insert in the database query command the plurality of database commands to generate a modified query command; and
  a database interface configured to perform the modified command to that decrypts the encrypted column to obtain column data of the column and performs the received database query command on the obtained column data.

18. The apparatus of claim 17, wherein the database query command includes a reference operation from the encrypted column.

19. The apparatus of claim 17, wherein a third database command of the plurality of the database commands encrypts data being updated in the encrypted column in response to the database query command including an update operation to the encrypted column.

20. The apparatus of claim 17, wherein the key encrypting the column is wrapped by one or more master keys and stored in a metadata table.

21. The apparatus of claim 17, further comprising:
  a determining mechanism configured to determine whether the database query command includes an explicit command to encrypt the column in the database; and
  an encrypting mechanism configured to encrypt the column in response to determining that the database query command includes an explicit command to encrypt the column in the database.

22. The apparatus of claim 17, further comprising:
  a determining mechanism configured to determine whether the database query command includes an operation to change an encryption key for the column;
  a decrypting mechanism configured to decrypt the column with a current encryption key; and
  an encrypting mechanism configured to encrypt the column with a new encryption key.

23. The apparatus of claim 17, further comprising:
  a determining mechanism configured to determine whether the database query command includes an explicit command to decrypt the column in the database; and
  a decrypting mechanism configured to decrypt the column using the explicit command in response to the database query command including the explicit command to decrypt the column in the database.

24. The apparatus of claim 17, further comprising:
  a determining mechanism configured to determine whether the database query command includes an operation to change an encryption function for the column;
  a decrypting mechanism configured to decrypt the column with a current encryption function; and
  an encrypting mechanism configured to encrypt the column with a new encryption function.

25. The method of claim 6, wherein the first operation retrieves the key at execution time, thereby ensuring that the key appears in a user session's per-execution memory.

26. The computer-readable storage medium of claim 9, wherein the first operation retrieves the key at execution time, thereby ensuring that the key appears in a user session's per-execution memory.

27. The apparatus of claim 17, wherein the first operation retrieves the key at execution time, thereby ensuring that the key appears in a user session's per-execution memory.

* * * * *

UNITED STATES PATENT AND TRADEMARK OFFICE
CERTIFICATE OF CORRECTION

PATENT NO. : 10,339,336 B2
APPLICATION NO. : 10/459811
DATED : July 2, 2019
INVENTOR(S) : Lei et al.

Page 1 of 1

It is certified that error appears in the above-identified patent and that said Letters Patent is hereby corrected as shown below:

In the Specification

In Column 6, Line 61, delete "'DESS'" and insert -- 'DES3' --, therefor.

In the Claims

In Column 10, Line 19, in Claim 9, delete "determining," and insert -- determining --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*